United States Patent

Morokuma

[11] Patent Number: 5,291,026
[45] Date of Patent: Mar. 1, 1994

[54] METHOD FOR MEASURING ECCENTRICITY

[75] Inventor: Tadashi Morokuma, Tokyo, Japan

[73] Assignee: Olympus Optical Co., Ltd., Tokyo, Japan

[21] Appl. No.: 9,986

[22] Filed: Jan. 27, 1993

[30] Foreign Application Priority Data

Jan. 29, 1992 [JP] Japan ................................. 4-14358

[51] Int. Cl.$^5$ ............................................. G01N 21/86
[52] U.S. Cl. .................................. 250/237 G; 250/561
[58] Field of Search ............... 250/561, 237 R, 237 G, 250/231.16; 356/356; 73/707

[56] References Cited

U.S. PATENT DOCUMENTS

| | | | |
|---|---|---|---|
| 3,553,469 | 1/1971 | Stutz et al. | 250/231.14 |
| 4,524,347 | 6/1985 | Rogers | 250/231.16 |
| 4,883,955 | 11/1989 | Kawasaki et al. | 250/237 G |

OTHER PUBLICATIONS

"Method of measuring rotation tolerance of high-accuracy rotary axis and its problems" Masaji Sawabe Oct. 1979 Precision Instrument, vol. 45, No. 10.

*Primary Examiner*—David C. Nelms
*Assistant Examiner*—K. Shami
*Attorney, Agent, or Firm*—Cushman, Darby & Cushman

[57] ABSTRACT

A method for measuring eccentricity uses two radial gratings, in annular areas of which elementary patterns are provided at equal intervals so that the patterns of one radial grating are opposite to those of the other radial grating rotated by 180°. Reference lines are provided on a rotary axis having eccentricity to be measured, coordinate axes relative to a bisector of the patterns opposite to each other are provided parallel with the reference lines, and spaces between the coordinate axes and the reference lines are measured, thereby allowing the shift of the rotary axis to be found. Thus, the eccentricity of the rotary axis can be measured with high accuracy.

4 Claims, 6 Drawing Sheets

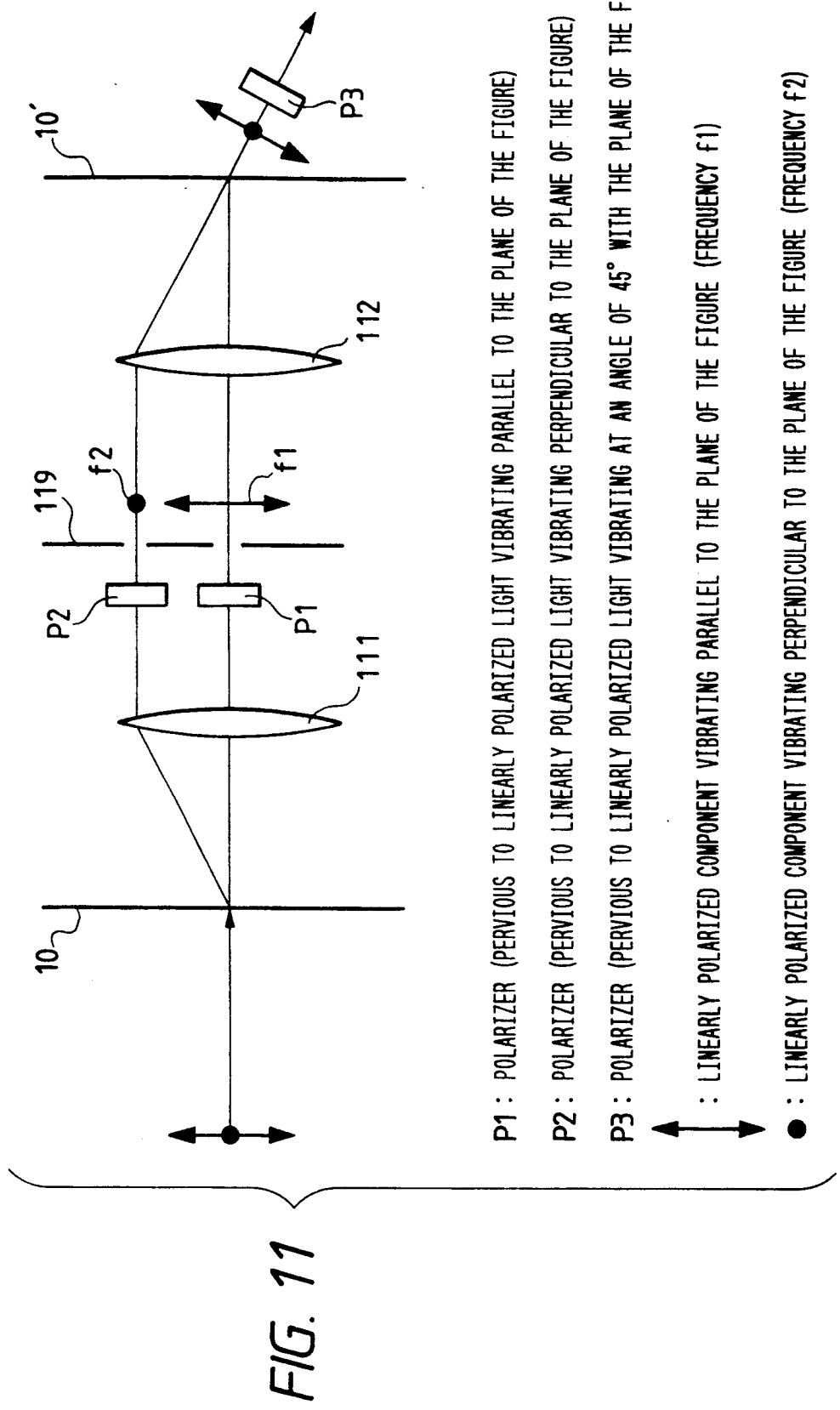

METHOD FOR MEASURING ECCENTRICITY

BACKGROUND OF THE INVENTION a) FIELD OF THE INVENTION

This invention relates to a novel method for measuring eccentricity which does not depend on the accuracy of a reference cylindrical surface.

b) DESCRIPTION OF THE PRIOR ART

The measurement of eccentricity of a rotary axis has been made by detecting whether a fiducial point provided on the rotary axis produces a perfect circle, with the rotation of the rotary axis, in a plane perpendicular to it. In this case, the detection of roundness is performed on the basis of a coincidence with a reference cylindrical surface produced with sufficient accuracy or of the locus of a rotary axis making use of a cylindrical surface produced with sufficient accuracy. However, the accuracy of the cylindrical surface for reference depends on the machining tolerance of machine tools and operator skill. Consequently, as the accuracy of the eccentricity measurement is to be improved, it becomes difficult to make the reference cylindrical surface with a higher degree of accuracy. For instance, if the tolerance of the order of 1 nm is imperative, such difficulty will greatly increase.

SUMMARY OF THE INVENTION

It is, therefore, an object of the present invention to provide a novel method for measuring eccentricity which permits the measurement of the eccentricity of a rotary axis with a high degree of accuracy and the elimination of the eccentricity, without depending on the accuracy of the reference cylindrical surface.

According to the present invention, the method for measuring eccentricity uses a first radial grating having elementary patterns at nearly equal intervals in its annular area and a second radial grating having the elementary patterns identical with those of the first radial grating and rotated by 180° with respect to the first radial grating so that the patterns of the second radial grating are opposite to those of the first radial grating. Reference lines are provided so as to pass a rotary axis, eccentricity of which is to be measured, coordinate axes relative to a bisector of the elementary patterns of the first and second radial gratings opposite to each other are made parallel to the reference lines, and distances between the coordinate axes and the reference lines are measured, thereby finding the eccentricity of the rotary axis.

This and other object as well as the features and advantages of the present invention will become apparent from the following detailed description of the preferred embodiments when taken in conjunction with the accompanying drawings.

BRIEF DESCRIPTION OF THE DRAWINGS

FIG. 11 is a view for explaining a fifth embodiment of the present invention.

DETAILED DESCRIPTION OF THE PREFERRED EMBODIMENTS

Prior to the description of the embodiments, reference is made to the principle of the method for measuring eccentricity according to the present invention.

Figure 1:
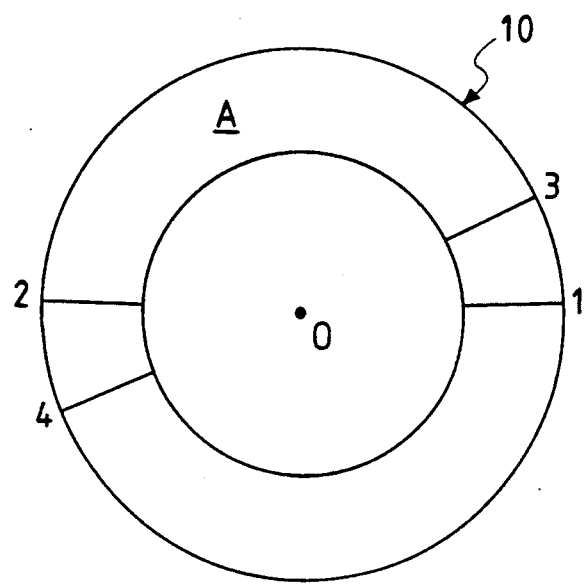
FIG. 1 is a view showing rulings in the area of a first radial grating.

FIGS. 1 to 4 are views for explaining the principle of the present invention. FIG. 1 depicts ruled lines 1, 2, 3, and 4 provided as elementary patterns in an annular area A of a first radial grating 10. Here, the ruled lines 3 and 4, as well as the ruled lines 1 and 2, correspond to different diameters of concentric circles and are paired with each other. Although for simplicity only two patterns are described here, it is needles to say that a great number of patterns is provided in the annular area to correspond to mutually different diameters.

Figure 2:
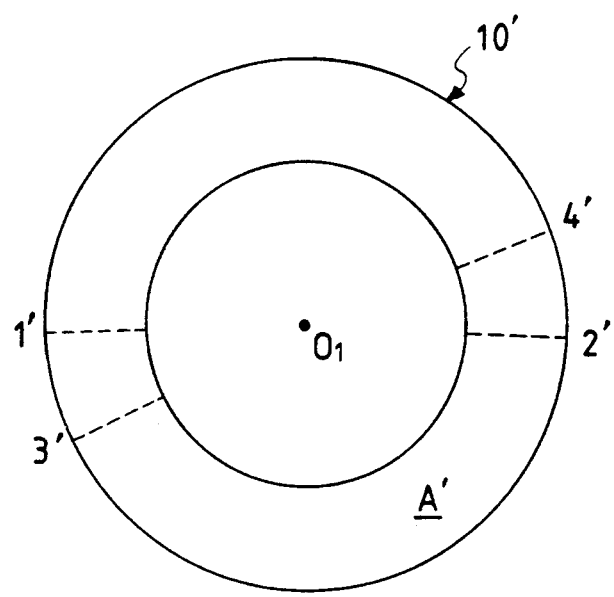
FIG. 2 is a view showing a second radial grating rotated 180° from the position shown in FIG. 1.

FIG. 2 shows a second radial grating 10'. It is identical with the first radial grating 10, but is used at a position where it is rotated by 180° with respect to the first radial grating 10. As such, the ruled lines of the elementary patterns of the second radial grating 10' opposite to the ruled lines 1, 2, 3, and 4 of the first radial grating 10 are numerals 2', 1', 4' and 3', respectively, indicated by broken lines in FIG. 2.

Figure 3:
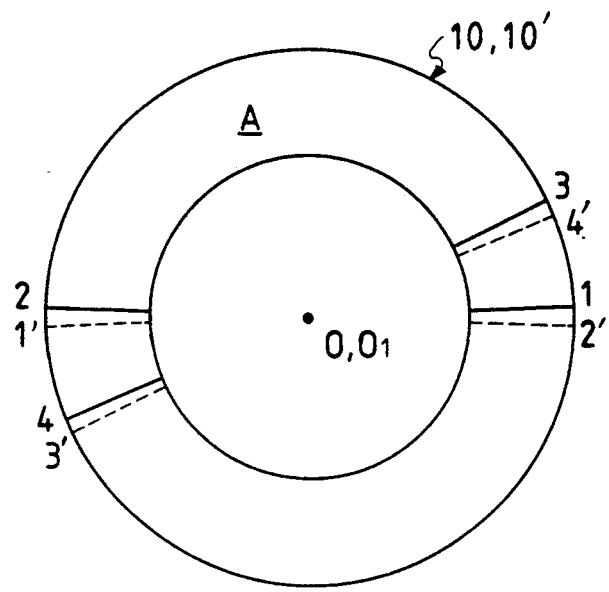
FIG. 3 is a view showing a state where the first radial grating shown in FIG. 1 is overlapped with the second radial grating in FIG. 2.

FIG. 3 is a view showing a state where these two radial gratings 10 and 10' are overlapped so that their centers O and $O_1$ coincide with each other. If the individual lines of the gratings were to be ruled without any error, the opposite ruled lines 1 and 2', 2 and 1', 3 and 4', and 4 and 3' would completely coincide in position. Actually, the ruled lines have slight shifts because of angular errors (errors caused by the fact that individual diameters traverse the points slightly shifted from the center O or $O_1$ of the radial grating). These shifts are too small to be viewed, and hence are greatly exaggerated in the figure. In the radial gratings thus overlapped, a bisector of an angle made by the two opposite ruled lines (for instance, the ruled lines 1 and 2') will surely traverse the center O (or $O_1$) of the radial grating. Hence, the application of the bisector to the eccentricity measurement makes it possible to perform the measurement with an extremely high degree of accuracy, without any angular error.

Figure 4:
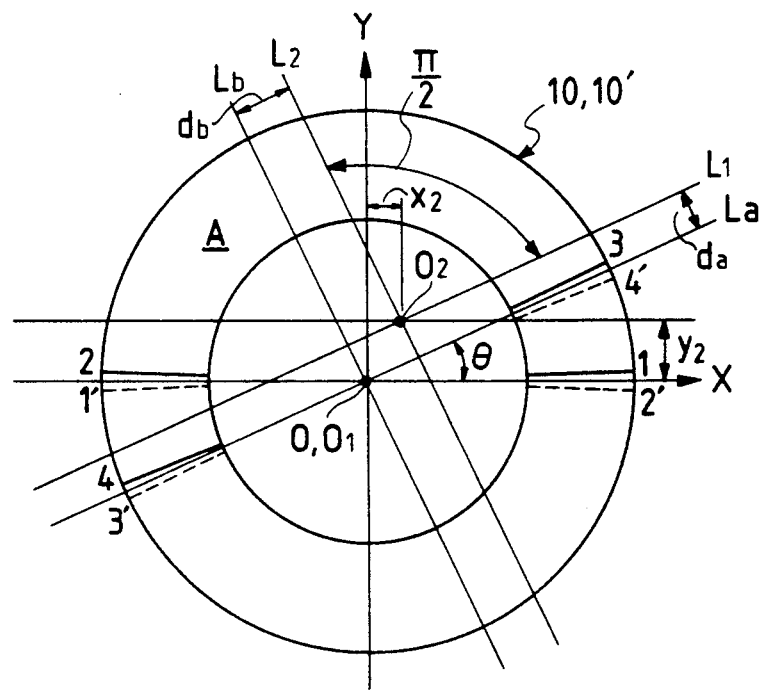
FIG. 4 is a view for explaining the principle of the present invention.

Next, a description will be given of the measuring method. In FIG. 4, symbols X and Y represent orthogonal coordinate axes held to the radial grating, and the X axis is chosen to be the bisector of the ruled lines 1 and 2', and 2 and 1'. On the other hand, two reference lines $L_1$ and $L_2$ are orthogonal coordinate axes held to the rotary axis, and $O_2$ denotes its point of intersection, namely, an origin. In this figure, the reference line $L_1$ is drawn parallel with a bisector $L_a$ relative to the ruled lines 3 and 4', and 4 and 3'. Symbol $L_b$ designates an axis which is perpendicular to the bisector $L_a$ and traverses the origin O. Now, when the coordinates indicative of the position of the origin $O_2$ in terms of the coordinate system $L_a$-$L_b$ are represented by $(d_a, d_b)$, the coordinates in terms of the coordinate system X-Y by $(x_2, y_2)$, and an angle made by the coordinate axis $L_a$ with the X axis by $\theta$, the relation among them is given by $$x_2 = -d_a \sin\theta + d_b \cos\theta \tag{1}$$

$$y_2 = d_a \cos\theta + d_b \sin\theta \tag{2}$$

Hence, if the coordinates $(d_a, d_b)$ and the angle $\theta$ are measured, the locus of the origin $O_2$ caused by the rotation of the rotary axis can be found. Because the coordinate axes $L_1$ and $L_2$ are held to the rotary axis, the center of the locus of the origin $O_2$ corresponds to an actual position of the rotary axis. Thus, the position of the rotary axis based on the reference systems of the radial gratings is determined.

As mentioned above, the method of the present invention allows eccentricity to be measured by determining the distances between the coordinate axes of the radial gratings and the reference lines fixed to the rotary axis, and thus dispenses with the need for the accurate cylindrical surface which is the reference of measurement. In addition, by the use of two overlapping radial gratings, the manufacture errors of the radial gratings are canceled out and a very high degree of accuracy of measurement is maintained. Although in the above description the coordinate axes and reference lines are taken as orthogonal systems, they may, of course, be oblique systems. In the case of the oblique system, Eqs. (1) and (2) may be altered accordingly.

Figure 5:
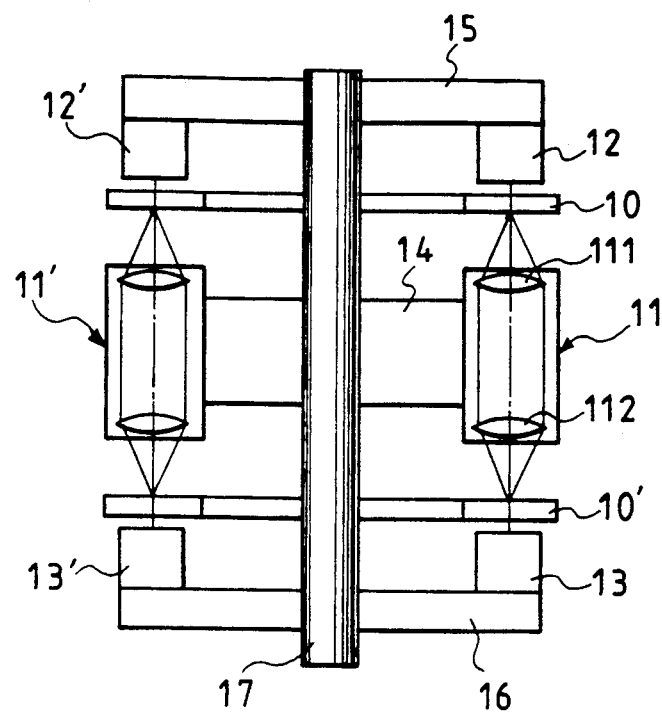
FIG. 5 is a view showing the arrangement of a first embodiment of the present invention.
Figure 6:
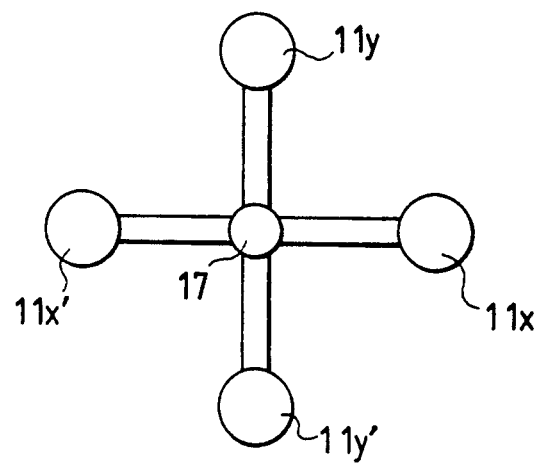
FIG. 6 is a view showing an example of the arrangement of ruling detection systems in the first embodiment.

The embodiments of the present invention will be explained below. FIGS. 5 and 6 show a first embodiment of the method for measuring eccentricity, based on the principle of the present invention. The two radial gratings 10 and 10' are annular plates having openings for holding a rotary axis 17 at their centers, and are fixed in a proper way so as to be independent of the rotation of the rotary axis 17. Here, the radial grating 10' is a replica, or a photocopy, of the radial grating 10 which is made as a master grating, and is disposed to form the positional relationship shown in FIG. 3. Reference numeral 11 represents an optical projection system, which consists of lens units 111 and 112 equal in focal length and images the ruled lines of the radial grating 10 on those of the radial grating 10' at a magnification of $-1\times$. Reference numeral 11' denotes another optical projection system constructed identical with the optical projection system 11. Numerals 12 and 12' denote illumination systems for illuminating the radial grating 10, and 13 and 13' designate detection systems for observing or detecting the overlapping of the images of the ruled lines of the radial grating 10 with the ruled lines of the radial grating 10'. The optical projection systems 11 and 11', the illumination systems 12 and 12', and the detection systems 13 and 13' are held to the rotary axis 17 through fixed plates 14, 15, and 16, respectively, to be rotatable together with the rotary axis 17. These systems will be hereinafter referred to as ruling detection systems. In this instance, as depicted in FIG. 6, four ruling detection systems 11x, 11x', 11y, and 11y' are provided at equal angular intervals of 90° on a circle with its center at the rotary axis 17. One line connecting the ruling detection systems 11x and 11x' corresponds to the coordinate axis $L_1$, and the other line connecting the ruling detection systems 11y and 11y' to the coordinate axis $L_2$.

The optical projection systems 11 and 11' are each constructed as an afocal equimagnification system composed of two lens units equal in focal length. Whereby, if the opposite ruling images of the two radial gratings overlap, the optical axis of the optical projection system will be positioned on the bisector of the angle made by the opposite ruled lines. Setting the optical projection systems 11 and 11' at proper positions, the radial gratings are fixed by adjusting the positions of the radial gratings and the rotary axis so that the opposite ruling images overlap. The positions chosen at this time correspond to the X-Y coordinate axes. Under these circumstances, the rotary axis is rotated by an angle $\theta$ to measure the spaces between the opposite ruling images. The distance $d_a$ is determined as an average of measured values obtained from the two ruling detection systems 11x and 11x', while for the ruling detection systems 11y and 11y', the distance $d_b$ can be likewise determined at the same time. Since the angle of rotation $\theta$ is already known, the position of the center of the rotary axis is found from these measured data.

Although the case where the radial gratings are stationary has been so far described, the radial gratings may, of course, be rotated in such a manner that the other individual systems remain stationary. Specifically, the radial gratings are first fixed to the rotary axis so that the center of the radial gratings practically coincides with that of the rotary axis. The rotary axis is then rotated to measure the spaces between the coordinate axes relative to the bisector and the fixed reference lines. The movement of the center of the radial gratings is thus found, from which that of the center of the rotary axis can be measured.

In FIG. 6, although the four ruling detection systems are disposed at angular intervals of 90° so that the reference lines $L_1$ and $L_2$ are perpendicular to each other, they need not necessarily be perpendicular unless parallel with each other. In such an instance, the amount of eccentricity is easily determined from a geometrical consideration. If the spaces between the ruled lines of the radial gratings are set to nearly 10 $\mu$m or less, the coordinates $d_a$ and $d_b$ can be obtained by detecting not the individual ruling images, but the so-called moiré fringes.

Figure 7:
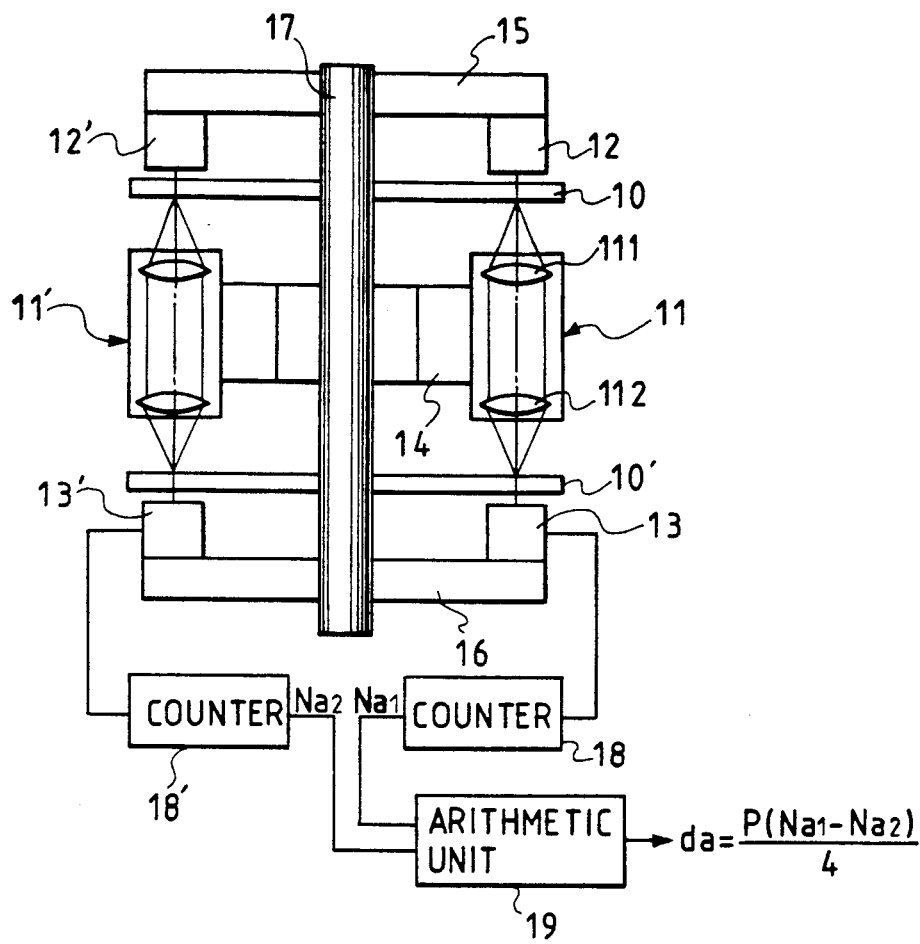
FIG. 7 is a view showing an example which utilizes the first embodiment for detecting moiré fringes.

FIG. 7 shows an example of the method for measuring eccentricity which uses the optical system constructed similar to the first embodiment to detect moiré fringes. In this example, the two radial gratings 10 and 10' are fixed to the rotary axis 17. The fixed plates 15 and 16 are also used as bearings and stationary without rotating with the rotary axis 17. The optical projection systems 11 and 11' are fixed by a proper means so as to be coaxial with the illumination systems 12 and 12' and the detection systems 13 and 13', respectively. Of the four ruling detection systems 11x, 11x', 11y, and 11y', only two systems 11x and 11x' are shown in the figure. By projecting the ruling images of the radial grating 10 onto the radial grating 11 through the optical projection systems 11 and 11' of $-1\times$ in magnification, moiré fringes are formed. These are detected by the detection systems 13 and 13'. Since the formation and the technique of detection of moiré fringes are well known, their explanations are omitted.

For the optical projection systems, whenever the radial gratings are rotated by half a grating space, moiré fringes change in number by one. When $\theta=0$, two sets of moiré-fringe counters 18 and 18' in terms of the X axis are set to zero, along with other two sets of counters, not shown, in terms of the Y axis, and then the rotary axis is rotated. Calling $N_{a1}$ the counted value, including a fraction, of the moiré fringes at the angle $\theta$ in the counter 18, $N_{a2}$ the counted value in the counter 18'. $N_{b1}$ and $N_{b2}$ the counted values in the counters concerning the Y axis, and p the grating space, the spaces between the reference lines and the coordinate axes relative to the bisector are given by $$d_a = (p/2)\{(N_{a1}-N_{a2})/2\} \quad (3)$$

$$d_b = (p/2)\{(N_{b1}-N_{b2})/2\} \quad (4)$$

Reference numeral 19 in FIG. 7 represents an arithmetic unit for calculating Eq. (3). If $(p/2)\{(N_{a1}+N_{a2})/2\}$ and $(p/2)\{(N_{b2}+N_{b2})/2\}$ are calculated, the angle of rotation $\theta$ will be obtained in either case. Further, if a mean between these values is taken, the periodic errors of the radial gratings can be canceled out.

Figure 8:
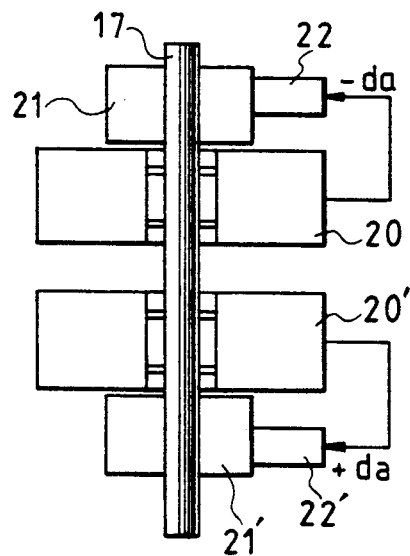
FIG. 8 is a view showing the arrangement of a second embodiment of the present invention for obtaining a runout-free rotary axis by applying the method for measuring eccentricity.

FIG. 8 shows a second embodiment of the present invention for realizing a runout-free rotary axis by applying the method for measuring eccentricity. In this embodiment, two eccentricity detection systems 20 and 20' are mounted along the rotary axis 17. The eccentricity detection systems 20 and 20' include the same arrangement as in FIG. 7, that is, two radial gratings, four ruling detection systems and moiré-fringe counters, and two arithmetic units.

Where the adjustment of eccentricity is performed in relation to the X axis, the runout of the rotary axis is detected in the direction of the X axis by the eccentricity detection systems 20 and 20', and the center position of the two radial gratings is adjusted so that outputs for detecting the runout are minimized. By doing so, the centers of the rotary axis and the radial gratings can be made to approximately coincide with each other. Reference numerals 21 and 21' designate bearings, which can be moved along the X axis by actuators 22 and 22' driven by the outputs from the eccentricity detection systems 20 and 20'. Hence, the movement of the rotary axis 17 in the X-axis direction is controlled by the individual actuators so that the outputs of the eccentricity detection systems 20 and 20' are reduced to zero. The runout-free rotary axis can thus be realized by taking the line connecting the centers of the two radial gratings as an axis. On the other hand, the movement of the rotary axis 17 in the Y-axis direction may be conducted by moving the bearings 21 and 21' along the Y axis by means of two other actuators, not shown.

Figure 9:
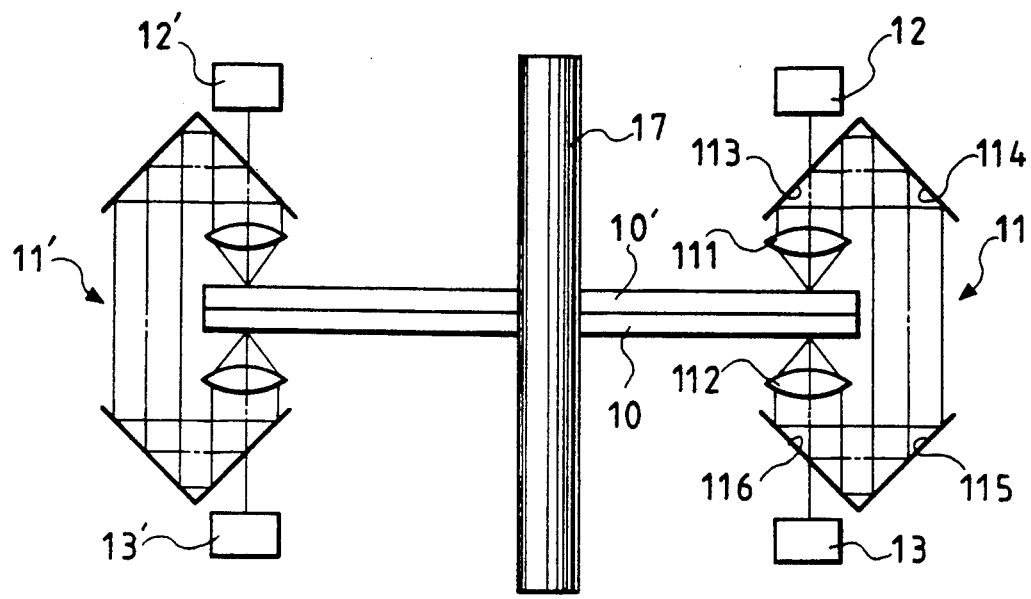
FIG. 9 is a view showing the arrangement of a third embodiment of the present invention.

FIG. 9 shows a third embodiment. The ruling detection systems in this embodiment are bilaterally disposed as in the embodiments mentioned above. Light emitted from the illumination system 12 illuminates the ruled lines of the radial grating 10' through a semi-transmissive mirror 113 and the lens 111. The images of the ruled lines are projected onto the ruled lines of the radial gratings 10 through the lens 111, the semi-transmissive mirror 113, reflection mirrors 114 and 115, a semi-transmissive mirror 116, and the lens 112. The positional relationship between the rules lines and the images is detected by the detection system 13. On the other hand, light emitted from the illumination system 12' also illuminates the ruled lines of the radial grating 10' as in the illumination system 12 and is projected onto the ruled lines of the radial grating 10. The positional relationship between the ruled lines and the image is detected by the detection system 13'. In the embodiment, the radial gratings 10 and 10' each are of reflection type and fixed to the rotary axis 17.

Figure 10A:
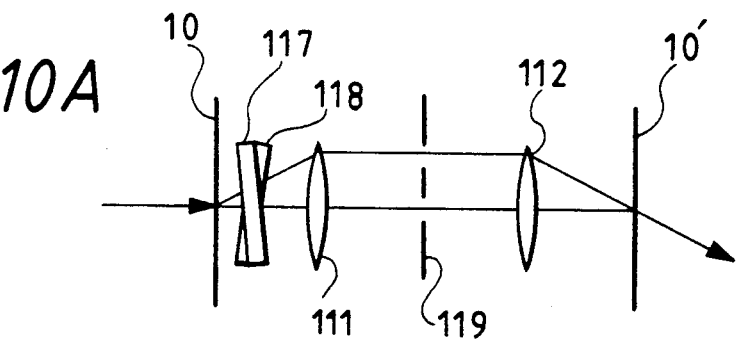
FIGS. 10A and 10B are view showing the arrangement of a fourth embodiment utilized for detecting moiré fringes and a positional relation of the shift of ruled lines when they are viewed through plane-parallel plates, respectively.
Figure 10B:
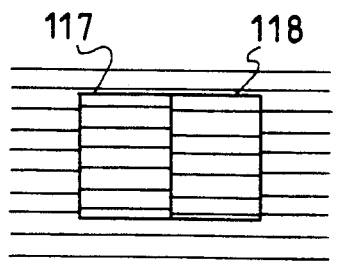

FIG. 10 shows a fourth embodiment which utilizes the technique for forming moiré fringes. Other techniques may, of course, be used. In FIG. 10A, two plane-parallel plates 117 and 118 are disposed between the radial grating 10 and the lens 111, and are tilted in directions opposite to each other, with the direction of the ruled lines as an axis. Their angles of inclination, as depicted in FIG. 10B, are adjusted so that the ruled lines are shifted to one another by ¼ pitch when viewed through the plane-parallel plates 117 and 118. Reference numeral 119 denotes a light-blocking plate placed at the focal plane of the lens 111 so as to be pervious to only the 0-th order light and the first order diffracted light. The 0-th order light is diffracted in the direction of the first order by the radial grating 10', while the first order diffracted light travels in straight lines to form moiré fringes. For the plane-parallel plates 117 and 118, the images of the ruled lines of the radial grating 10 are shifted to one another by ¼ pitch, so that the phase angle of the moiré fringes is also shifted by 90°. If, therefore, the moiré fringes are detected by two optical detectors (not shown), two signals whose phase angles are shifted by 90° will be obtained. These signals are required for the measurements of the direction of rotation of the rotary axis and the angle of rotation, or the fraction of fringes.

Finally, reference is made to a fifth embodiment of the present invention. FIG. 11 shows the principle in the measurement of the phase of moiré fringes by the so-called heterodyne interference technique. For the light source, a laser is used which has two linearly polarized components intersecting at right angles with frequencies f1 and f2, for instance. A beam of light from the light source is divided into the 0-th order light and the first order diffracted light by the radial grating 10. On the optical path of the 0-th order light is placed a polarizer P1 pervious to only the polarized component vibrating parallel to the plane of the figure, namely, the component of the frequency f1. On the optical path of the first order diffracted light is placed a polarizer P2 pervious to only the polarized component vibrating perpendicular to the plane of the figure, namely, the component of the frequency f2. The 0-th order light is diffracted by the radial grating 10', while the first order light is transmitted, without diffraction, by the radial grating 10'. The two beams, which travel in the same direction, pass through a polarizer P3 vibrating at an angle of 45° with the plane of the figure, and then enter a photodetector (not shown). A beat frequency equal to the difference in frequency between the two beams is detected by the photodetector. The phase angle of this beat signal represents that of moiré fringes. Hence, by measuring the phase angle of the beat signal, the phase of the moiré fringes can be found. Although the description of a specific method for measuring the phase is not given here, for example, a known heterodyne interference technique may be used. This embodiment utilizes the heterodyne interference of the 0-th order light and the first order diffracted light, but may make use of the 0-th order light and the higher order diffracted light, or two kinds of higher order diffracted light. It is needless to say that the foregoing method is easily applicable to the other embodiments of the present invention.

What is claimed is:

1. A method for measuring eccentricity in an apparatus provided with a first radial grating having elementary patterns at substantially equal intervals on a circumference and a second radial grating having elementary patterns identical with those of said first radial grating, said first radial grating and said second radial grating being maintained in mutually fixed relation at a position where said second radial grating is rotated by 180° with respect to said first radial grating, said first radial grating and said second radial grating being arranged so that the elementary patterns of said first and second radial gratings are substantially concentric with respect to a rotary axis having two reference lines intersecting with each other, wherein a position of an intersection of the reference lines is measured with respect to a coordinate system which includes a bisector of an angle made by one of the elementary patterns of said first radial grating with that of said second radial grating opposite thereto and which is formed by two lines parallel to the reference lines provided on said rotary axis, and thereby eccentricity of said rotary axis is measured with respect to an origin of said coordinate system.

2. A method for correcting eccentricity in an apparatus provided with a first radial grating having elementary patterns at substantially equal intervals on a circumference and a second radial grating having elementary patterns identical with those of said first radial grating, said first radial grating and said second radial grating being maintained in mutually fixed relation at a position where said second radial grating is rotated by 180° with respect to said first radial grating, said first radial grating and said second radial grating being arranged so that the elementary patterns of said first and second radial gratings are substantially concentric with respect to a rotary axis having two reference lines, wherein the reference lines are made to coincide with a coordinate system which includes a bisector of an angle made by one of the elementary patterns of said first radial grating with that of said second radial grating opposite thereto and which is formed by two lines parallel to the reference lines provided on said rotary axis, and thereby positioning of said rotary axis is performed.

3. The method according to claim 1, wherein said rotary axis and said first and second radial gratings are relatively rotated, a locus of movement of the intersection of said reference lines is detected, and thereby eccentricity of said rotary axis is measured.

4. An apparatus for measuring eccentricity, comprising:
a first radial grating having elementary patterns arranged at substantially equal intervals on a circumference;
a second radial grating having elementary patterns identical with those of said first radial grating, rotated 180° with respect to said first radial grating;
an illumination system for illuminating said first radial grating;
an optical projection system having a magnification of $-1\times$, for projecting images of the elementary patterns of said first radial grating on the elementary patterns of said second radial grating;
a rotary axis having reference lines intersecting with each other; and
a detection system for detecting a shift of the elementary patterns of said first and second radial grating from the reference lines.

* * * * *